(12) United States Patent  
Cook, Jr. et al.

(10) Patent No.: US 9,272,599 B1  
(45) Date of Patent: Mar. 1, 2016

(54) CONTROLLABLE LOAD DISTRIBUTION SYSTEM FOR A VEHICLE

(71) Applicants: Harrison L Cook, Jr., Shubuta, MS (US); Bradley T Robinson, Hoover, AL (US)

(72) Inventors: Harrison L Cook, Jr., Shubuta, MS (US); Bradley T Robinson, Hoover, AL (US)

( * ) Notice: Subject to any disclaimer, the term of this patent is extended or adjusted under 35 U.S.C. 154(b) by 0 days.

(21) Appl. No.: 14/705,143

(22) Filed: May 6, 2015

Related U.S. Application Data

(63) Continuation-in-part of application No. 14/587,977, filed on Dec. 31, 2014.

(51) Int. Cl.

| | |
|---|---|
| *B60G 17/018* | (2006.01) |
| *B60G 23/00* | (2006.01) |
| *B62C 3/00* | (2006.01) |
| *B62K 25/00* | (2006.01) |
| *G06F 7/00* | (2006.01) |
| *G06F 17/00* | (2006.01) |
| *G06F 19/00* | (2011.01) |
| *B60G 17/052* | (2006.01) |

(52) U.S. Cl.  
CPC .................................. *B60G 17/0528* (2013.01)

(58) Field of Classification Search  
CPC ........... B60G 2400/252; B60G 17/018; B60G 2400/102; B60G 2500/10; B60G 2400/204  
USPC ............................................................ 701/37  
See application file for complete search history.

(56) References Cited

U.S. PATENT DOCUMENTS

| | | | |
|---|---|---|---|
| 2003/0155164 A1* | 8/2003 | Mantini ............... | B60G 17/005 280/149.2 |
| 2011/0187070 A1* | 8/2011 | Hammond ........... | B60G 17/052 280/124.16 |

* cited by examiner

*Primary Examiner* — Maceeh Anwari  
(74) *Attorney, Agent, or Firm* — Peter Loffler

(57) ABSTRACT

A weight distribution system for dynamically controlling and adjusting the weight load on each axle of a vehicle uses a manifold that is fluid flow disposed between a source of pressured air of the vehicle and the air bags of the vehicle. The manifold allows an individual air bag to be inflated or deflated to a desired pressurization depending on either preprogrammed or user input parameters. By individually controlling the air bags, the system allows the setting of the maximum amount of weight to be borne by a given axle so that tires can be removed from that axle without weight overloading the remaining tires. The system also automatically self-levels the chassis of the vehicle and maintains proper ride height of the vehicle using input from a height sensor located on one of the axles. The system wirelessly communicates, terrestrially or via satellite, its parameters to roadway officials to verify that the vehicle is in compliance with weight loading requirements and to the home office or other location via a satellite link.

10 Claims, 2 Drawing Sheets

CONTROLLABLE LOAD DISTRIBUTION SYSTEM FOR A VEHICLE

This application is a Continuation-In-Part of U.S. patent application Ser. No. 14/587,977 filed on Dec. 31, 2014, which prior application is incorporated herein by reference in its entirety

BACKGROUND OF THE INVENTION

1. Field of the Invention

The present invention relates to a load distribution system for commercial vehicles wherein the inflation and deflation of each air bag of an air suspension system of the vehicle is controlled independently and automatically so as to maintain a desired pressure within each air bag so as to control the load being borne by each air bag and its axle so as to achieve optimum load distribution of the overall vehicle.

2. Background of the Prior Art

Under current United States Department of Transportation regulations, in a typical tractor-trailer combination (18 wheeler) the maximum weight load on the steering axle of the combination is 12,000 pounds, while the dual drive axle load is 34,000 pounds and the dual tandem trailer axle load is also 34,000, and the overall tractor-trailer rig cannot gross over 80,000 pounds combined. Additionally, each tire used on the typical tractor-trailer combination has a maximum load capability of 7,200 pounds so that the tires can support 14,400 pounds on the steering axle, 57,800 pounds on the drive axle and 57,800 pounds on the tandem trailer axle. Clearly, there is excess tire weight support capacity relative to the allowable load capacity on each axle.

Many modern truck and trailer manufacturers are implementing air bag suspension systems into their vehicles, turning away from the more traditional steel spring systems. Air bags tend to be lighter, more reliable, more efficient, have a lower natural frequency so as to produce a smoother and more comfortable ride for driver, vehicle, and cargo alike thereby reducing fatigue and minimizing the risk of damage respectively, and tend to reduce wear and tear on various components of the vehicle, among other benefits of air bag suspension systems. The weight of the vehicle and its load is transferred to the axles and thus the tires via a series of air bags, two air bags per axle. The air bags are pressurized and thereby suspend the weight of the vehicle. Modern air bag systems have appropriate sensors and leveling valves that work together to allow the chassis of the vehicle to remain level as the weight shifts as well as to remain at an optimal ride height. Modern air bag suspension systems may also have weight sensors to be able to detect an overload condition on a given axle, issuing an alarm if an overload condition is detected, allowing the operator to take corrective measures.

In an 80,000 pound gross maximum weight configuration for a tractor-trailer rig, as few as twelve 7,200 pound weight supportable tires can be utilized to support the 80,000 gross weight of the overall tractor-trailer combination, which means that more tires are being used on an 18-wheel tractor trailer combination than is required. Such extra tires increase the overall costs of rig operation in that the tires and wheel set themselves cost money to purchase and maintain. Additionally, the additional tires on the rig increase the rolling resistance of the rig which decreases fuel efficiency of the rig.

It would seem obvious to remove some of the tires from the tractor-trailer combination to save the costs associated with using the extra tires while still maintaining the sufficient tire weight bearing capacity required. However, this is not as easy as it seems. The load of the tractor-trailer is not uniform throughout the overall length of the rig, if the load were uniform, then tire removal might be possible. The non-uniform weight distribution on the tractor-trailer means that some axles bear more of the weight than other axles so that if tires were removed from a particular axle and that axle bore more weight for a given load relative to other axles, an overweight-capacity issue could be created, which can be dangerous.

Therefore, in order to be able to achieve tire removal from a tractor-trailer combination, and realize the attendant savings associated with such tire removal, it is necessary to control the weight distribution at each axle whereat a tire is removed so as to prevent overloading the remaining tires on such axle.

Some prior art systems have been proposed to better distribute weight load on each axle via so-called suspension slider systems. While effective for their intended purpose, such systems are designed to move weight loading onto or away from the tractor depending on the circumstances of a given load. Additionally, such systems are manual in operation and time-consuming to use.

What is needed is a system whereby the weight load imposed on a given axle of a tractor-trailer combination or even a standalone truck such as a dump truck can be controlled so as to allow the removal of one or more of the tires from the vehicle without fear of overloading the axle wherefrom the wheel is removed. Such a system must be automatic in its operation so that vehicle operator or mechanic input is not necessary once the system is properly installed. Such a system should be dynamic so that weight load distribution on the vehicle is automatically adjusted depending on the given conditions of a particular weight load. Ideally, such a system must be relatively inexpensive to produce, install, and maintain.

SUMMARY OF THE INVENTION

The controllable weight distribution system for a vehicle of the present invention addresses the aforementioned needs in the art by allowing the weight load on each axle to be controlled independently and automatically, based on preprogrammed parameters, which may be overridden by an operator. The use of the controllable weight distribution system for a vehicle allows the removal of wheels from one or more axles of the vehicle and controls the maximum weight load on such axle(s) so as not to overload the remaining tires on such axle(s). The controllable weight distribution system for a vehicle is automatic so that once installed and its software appropriately programmed, the system achieves its function without the necessity of operator involvement, although the controllable weight distribution system for a vehicle allows the operator to change the requisite parameters for a given set of circumstances. The controllable weight distribution system for a vehicle is of relatively simple design and construction, being produced using standard manufacturing techniques, so that the system is relatively inexpensive to produce, install (and uninstall is desired) and maintain so as to be economically attractive to potential consumers for this type of device. The controllable weight distribution system for a vehicle has the added feature of being able to wirelessly broadcast its operating parameters (especially the vehicle's overall weight) to highway officials so that such officials can verify compliance of the vehicle using the controllable weight distribution system for a vehicle with appropriate rules and regulations and possibly waive the vehicle past weigh station and other inspection checkpoints.

The controllable weight distribution system for a vehicle of the present invention is comprised of a manifold that has an inlet port that is fluid flow connected to a source of pressurized air (typically the pressurized air tank of the vehicle). The manifold also has a plurality of supply ports, each supply port fluid flow connected to a respective one of the air bags of the air suspension of the vehicle such that pressurized air is supplied to the air bag whenever the particular supply port for that air bag is open and the inlet port is open (and the exhaust port, described next, is closed). The manifold further has an exhaust port for exhausting air from at least one of the air bags whenever the at least one air bag has its supply port open and the exhaust port is open and the inlet port from the pressurized air source is closed. The various ports have electrically actuated valves to perform the opening and closing process. A control system is electrically connected to the inlet port for opening and closing the inlet port, to each of the supply ports for opening and closing each supply port individually, and the exhaust port for opening and closing the exhaust port, all such openings and closing based on the calculation of a set of data by the control system. A plurality of pressure sensors is provided such that each pressure sensor is attached to a respective one of the air bags for monitoring the pressure within the respective air bag. Each pressure sensor is electrically connected to the control system for providing pressure input (the pressure within the air bag) to the control system for the control system to use in the calculation of the set of data. A height sensor is provided and is attached to one of the axles of the vehicle for monitoring the ride height of the vehicle as well as helping to assure that the vehicle is level. The height sensor is electrically connected to the control system for providing ride height input to the control system for the control system to use in the calculation of the set of data. An algorithm is installed within the control system such that a processor within the control system processes the algorithm (the processor of the control system can be a general purpose processor commonly available or can be a customized processor). The algorithm receives the pressure input from each pressure sensor and ride height input from the height sensor and uses such inputs to calculate the set of data used to control the manifold based on the desired outputs set by the user. An input device is electrically connected to the control system such that the input device receives override input (a user, such as the vehicle operator inputs such override input via an appropriate input device, keyboard associated with a screen in the vehicle's cab, or the screen can be a touch control screen, etc.), that is communicated to the control system such that when the control system receives the override input, the control system overrides the set of data and uses the override input to control the manifold—for example, if the vehicle encounters slick road conditions, the operator can shift some of the weight from the axles of the trailer to the drive axles of the tractor, subject to the maximum limits on such axles, in order to increase the weight load on such drive axles in order to give the vehicle more traction. A first wireless transmitter is provided and is in signal communication (wired or wirelessly) with the control system such that the control system uses the pressure input from each pressure sensor and converts each such pressure input to a weight amount (via the processor) and sums each of the weight amounts to achieve an overall weight amount (the total weight of the vehicle) such that the first transmitter wirelessly transmits the overall weight amount to a receiver such as a weigh station. A second wireless transmitter is provided and is in signal communication (wired or wirelessly) with the control system such that the control system uses the pressure input from each pressure sensor and converts each such pressure input to a weight amount (via the processor) and sums each of the weight amounts to achieve an overall weight amount (the total weight of the vehicle) such that the first transmitter wirelessly transmits the overall weight amount to a different receiver such as the home office of the tractor-trailer company for monitoring of the company's fleet therefrom

BRIEF DESCRIPTION OF THE DRAWINGS

Similar reference numerals refer to similar parts throughout the several views of the drawings.

DESCRIPTION OF THE PREFERRED EMBODIMENT

Figure 1:
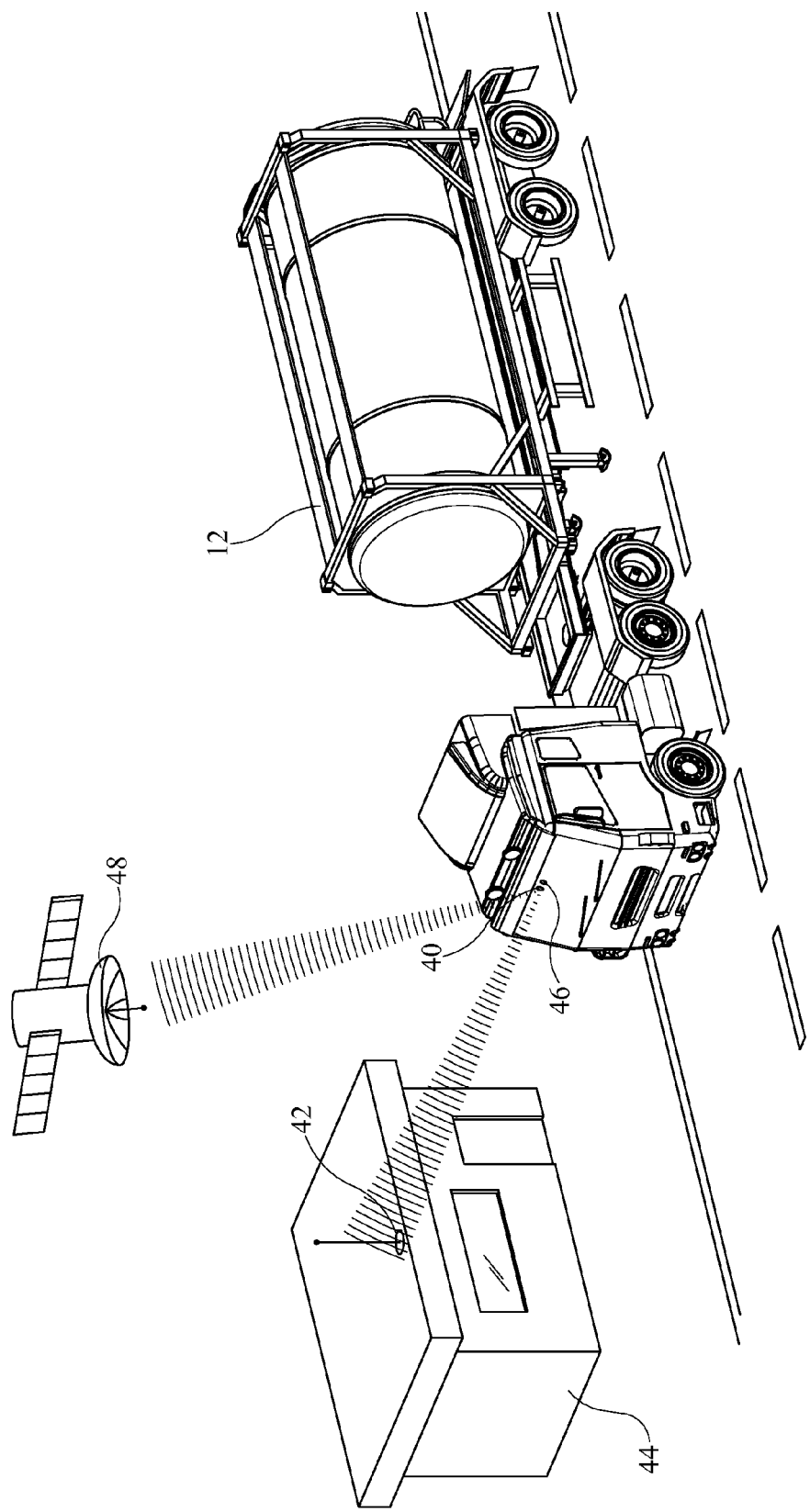
FIG. 1 is an environmental view of a tractor-trailer combination wirelessly communicating the operating parameters of the controllable weight distribution system for a vehicle of the present invention to a weigh station and to a satellite for rebroadcast to a desired terrestrial location therefrom.
Figure 2:
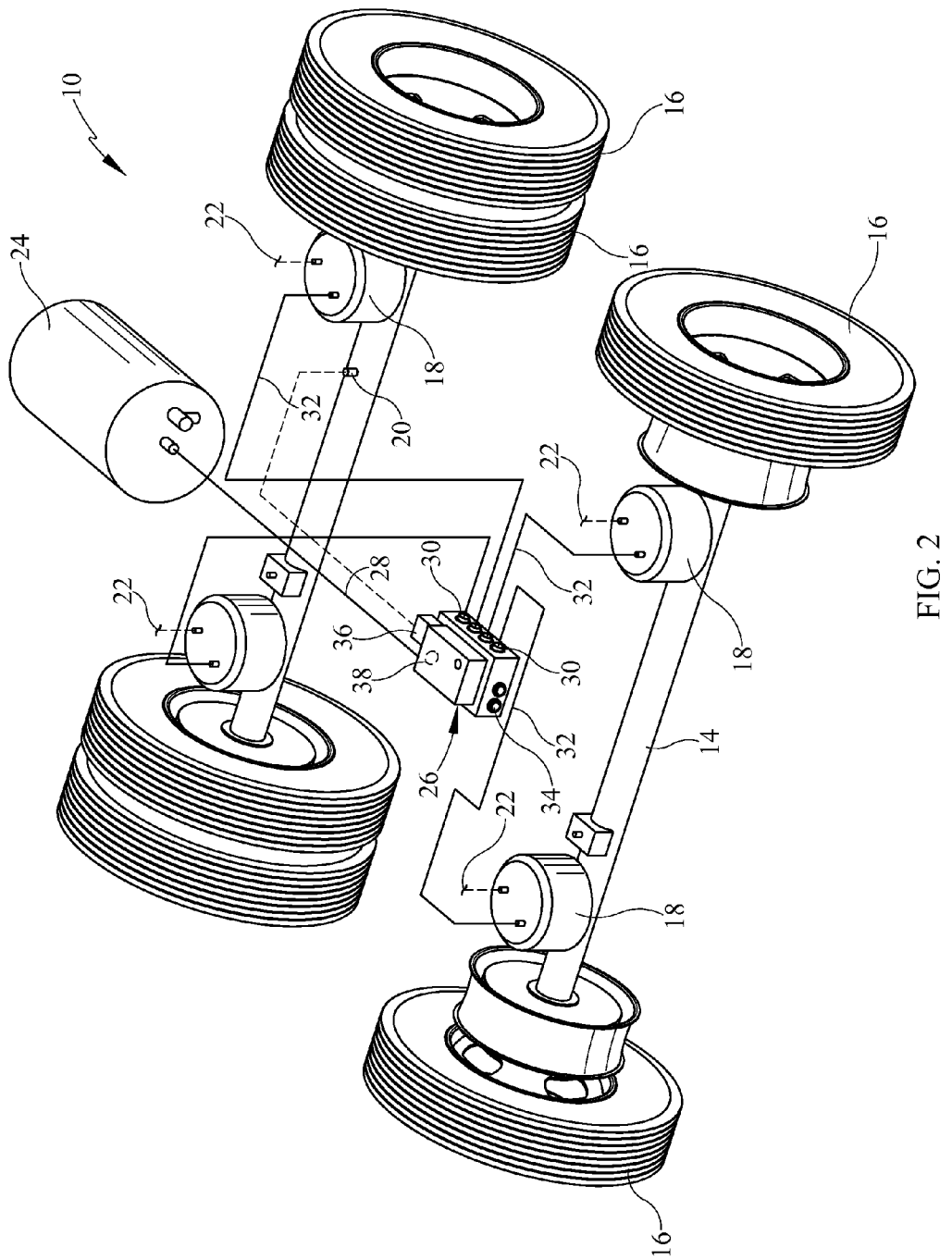
FIG. 2 is a perspective view of the controllable weight distribution system for a vehicle installed on an axle pair of the vehicle.

Referring now to the drawings, it is seen that the controllable weight distribution system for a vehicle of the present invention, generally denoted by reference numeral 10, is installed on a tractor-trailer combination 12, or even a single truck, such as a dump truck, wherein the vehicle at issue has an air bag suspension system. As seen, the vehicle has a series of axles 14 with a set of tires 16 on either side of each axle 14. In a typical modern tractor-trailer combination, there are two tires 16 on the steer axle, a total of eight tires 16 on the drive axle pair (four tires per axle) and a total of eight tires 16 on the tandem axle pair (four tires per axle)—the so-called 18 wheeler. Of course, other combinations are possible such as a tractor that has only a single drive axle or trailers that have a single axle or more than two axles, etc. As seen, each axle 14 has a pair of air bags 18 thereon, one air bag 18 on either side of the axle 14. Each air bag 18, part of the air suspension system of the vehicle 12, transfers the load of the vehicle 12 and its cargo to its respective axle 14 and thus to the tires 16 on the axle 14. Each air bag 18 has a pressure sensor 22 to monitor the pressure within each air bag 18. A height sensor 20, of any appropriate design known in the art (electrical, electromagnetic, optical, etc.), is located on one of the axles 14 of the vehicle (or on the single axle 14 if the vehicle, such as a trailer, is a single axle vehicle. The height sensor 20 measures the distance (ride height) between the sprung weight and the unsprung weight of the vehicle, stated another way, the distance between the suspension-mounting surface (the bottom of trailer frame or slider box) to the center of the axle 14.

The vehicle 12 has an air tank 24 (source of pressurized air) which is fluid flow connected to a manifold 26 via an air hose 28, which manifold 26 can be mounted in a desired location such as proximate the air tank 24 or on one of the axles 14. The manifold 26 has a series of supply ports 30, one supply port 30 for each air bag 18 being serviced by the manifold 26 such that each supply port 30 is fluid flow connected to a respective one of the air bags 18 via an air hose 32. The manifold 26 has one or more exhaust ports 34 as well as an electronic control system 36 which controls operation of the manifold 26.

The controllable weight distribution system for a vehicle 10 operates such that the manifold 26 can supply air to an individual air bag 18 (or multiple air bags 18) in order to increase the air pressure in the air bag 18 by opening an inlet port 38 between the manifold 26 and the air tank 24, opening the supply port 30 that is fluid flow connected to the desired air bag 18 and closing the remaining supply ports 30 and the exhaust ports 34. Air flows from the air tank 24 through the manifold 36 to the desired air bag 18 until the desired pressure within the air bag 18 is reached, as sensed by the pressure sensor 22 of that air bag 18, so that the pressure sensor sends its data to the control system 36 and the control system, recognizing that the desired pressure is in the particular air bag 18, sends a signal to the manifold to close all of the ports 30, 34, and 38. Each of the ports 30, 34, 38 is an electrically actuated valve of appropriate design and is controlled by signals from the control system 36. Similarly, the controllable weight distribution system for a vehicle 10 can decrease the air pressure within a single air bag 18 (or multiple air bags 18) by closing the inlet port 38 between the manifold 36 and the air tank 24, opening the supply port 30 for the given air bag 18 while closing the remaining supply ports 30 and opening the exhaust ports 34. Air is exhausted from the desired air bag 18 into the atmosphere by flowing from the air bag 18 and through the manifold 26, exiting the manifold 26 via the exhaust ports 34. Once the air pressure within the air bag 18 has been reduced to a desired level, all open ports 30 and 34 are closed.

The controllable weight distribution system for a vehicle 10 allows the air pressure within each air bag 18 to be individually controlled, the amount of the air pressure determining how much load is being borne by that air bag 18. Therefore, if tires 16 are removed from an axle 14 so that the maximum allowable weight load on that axle 14 is reduced, the controllable weight distribution system for a vehicle 10 adjusts the maximum pressure that can be put into the air bags 18 on that axle 14. If, due to a load shift or other factor, the weight being borne by the axle 14 with tires 16 removed exceeds its maximum weight load limit, the control system 36 senses such a condition via input from the pressure sensor 22 of the respective air bags 18 and automatically adjusts the air pressure within these air bags 18 to bring the weight load on the axle 14 to a safe limit, shifting the excess load to the other air bags 18 via a predetermined algorithm. The controllable weight distribution system for a vehicle 10 can preprogrammed by the installer so that the weight loading on each of the axles 14 that is present is based on some desired algorithm (for example, the controllable weight distribution system for a vehicle 10 can be preprogrammed so as to distribute the weight onto each axle 14 (or more precisely onto each tire 16) as uniformly as possible, irrespective of whether any tires 16 are removed or not, subject to the maximum load limits or the controllable weight distribution system for a vehicle 10 in order to distribute the loading uniformly onto each tire which helps preserve the life of the tires 16 and also helps with stopping distances of the vehicle 12, or the controllable weight distribution system for a vehicle 10 can receive input from other vehicles systems and adjust the weight distribution based on such inputs so that if such other systems sense that the roads are slick due to rain or snow, an appropriate weight distribution adjustment is made). The controllable weight distribution system for a vehicle 10 can also auto engage any extra load axles after other axles 14 have reached their full weight capacity, as may be experienced in dump trucks or heavy haul trucks that have drop down axles, for example. The control system 36 is also in signal communication with the height sensor 20 and adjusts the ride height of the vehicle as well as levels the vehicle. As air suspension systems are designed to operate at a specific ride height, the control system 36 receives ride height input from the height sensor 20 and adjusts the air suspension system as needed either supplying air (opening inlet port 38 and supply ports 30 and closing exhaust ports 34) to the air bags 18 if the ride height is too low or exhausting air (closing inlet port 38, opening supply ports 30 and opening exhaust ports 34) from the air bags 18 if the ride height is too high all the while maintaining the desired weight distribution among the air bags 18.

The distribution of weight can also be operator controlled or some combination with the preprogrammed algorithm therefore. For example, the controllable weight distribution system for a vehicle 10 can be preprogrammed as desired, however, the operator can override the programming. For example, if the operator encounters slick road conditions and the system does not adjust as desired by the operator, the operator can add more weight load onto the drive or steer axles of the tractor in or to help better control the vehicle 12. As noted, such conditions can also be input into the control system 36 by communicatively coupling the control system 36 to the vehicle's computer system (not illustrated) in appropriate fashion so as to further automate the processing by the control system 36. An appropriate input screen (keyboard based, touch screen, etc.,—none illustrated) can be provided within the cab of the tractor in order to allow the operator to control the controllable weight distribution system for a vehicle 10 if desired as well as to monitor the system with the various parameters displayed on the screen and configured as desired.

Of course controllable weight distribution system for a vehicle 10 can be used for various axle combinations including standalone trucks that have two, three or more axles, as well as trailers that have more or less than two axles and even for multiple trailer combinations. In trailer usage, each trailer will have its own manifold 26 and control system 36 with the controllable weight distribution system for a vehicle 10 having a master control system for controlling each of the individual control systems 36 of each manifold 26 (for example, one manifold control system combination on the steer axles, one manifold-control system combination on the drive axles of the tractor (or one total for the steer and drive axles), and one manifold-control system combination on the trailer). Each of the control systems 36 has its own processor onboard for performing the various calculations and issuing commands as needed and also has data storage capability for not only holding the algorithm thereon (if not in firm ware) but also for other purposes such as retaining the data throughout an operating cycle such that such data can be downloaded and analyzed as desired.

The control system 36 of the controllable weight distribution system for a vehicle 10 is integrated into the vehicle's onboard computer system called CAN (control system area network) bus system in order to allow the control system 36 to communicate its various measured parameters, especially the weight measurements to other components communicating with the CAN as well as to receive data from such other components in order to input such data into the algorithm.

The controllable weight distribution system for a vehicle 10 may also have a wireless transmitter 40 that is capable of terrestrially communicating with a receiver 42 maintained by roadway officials, such as at a typical weigh station 44 found on the various highways of this country. The control system 36 is coupled to the transmitter 40 in appropriate fashion (either hard wired or itself coupled to the transmitter wirelessly) and can send out its operating parameters (typically the overall weight of the vehicle 12 which is summed from each of the air bags 18 on the vehicle 12 using the pressure sensor 22 input for such weight calculation of each individual air bag 18 and/or the axle weights such as the steer, drive, and/or tandem axle weights either individually, grouped, or total) to the receiver 42 so that roadway officials can quickly determine whether the vehicle 12 is in compliance with regulations and if so, waive it past the weigh station 44. Of course, the receiver can be disposed within a vehicle of a roadway official so that such official can make the weight compliance determinations while cruising the highways during his or her routine. This not only helps increase the overall safety on the highways by helping assure that trucks are in weight compliance more dynamically, but also increases transportation efficiency by reducing the need for trucks to stop at weigh stations 44, thereby reducing the operator's downtime.

Additionally, the control system 36 communicates its various measured parameters, especially its weight measurements to the vehicle's onboard satellite communication system 46 in appropriate fashion, such as via a J1939 bus connection connected to the aforementioned CAN. This allows the vehicle 12 to transmit its weight data to the home office (or other desired location) via satellite 48 communication. The satellite communication system can be used to communicate to roadway officials instead of using terrestrial communication via the transmitter 42, if the roadway officials have such satellite communication capability While the invention has been particularly shown and described with reference to an embodiment thereof, it will be appreciated by those skilled in the art that various changes in form and detail may be made without departing from the spirit and scope of the invention.

We claim:

1. A weight distribution system for a vehicle, the vehicle having a plurality of axles, each axle having a pair of suspension air bags thereon for supporting the weight of the truck onto the axle, the vehicle also having a control system area network that is connected to a set of components of the vehicle, the weight distribution system comprising:

a manifold having an inlet port adapted to be fluid flow connected to a source of pressurized air, the manifold further having a plurality of supply ports, each supply port fluid flow connected to a respective one of the air bags for supplying the pressurized air to the air bag whenever the particular supply port and the inlet port is open, the manifold further having an exhaust port for exhausting air from at least one of the air bags whenever the at least one air bag has its supply port open and exhaust port is open and the inlet port is closed, the manifold adapted to be attached to the vehicle; and a control system electrically connected to the inlet port for opening and closing the inlet port, the control system also connected to each of the supply ports for individually opening and closing each of the supply ports, such that the control system opens a given supply port irrespective of whether or not any other supply port is open and such that the control system closes a given supply port irrespective of whether or not any other supply port is closed, and the control system connected to the exhaust port for opening and closing the exhaust port, based on a calculation of a set of data, the control system adapted to be attached to the vehicle and such that the amount of air held in each air bag is independent of the amount of air held in any other air bag being dependent only the calculation of the set of data.

2. The weight distribution system for a vehicle as in claim 1 further comprising a plurality of pressure sensors, each pressure sensor attached to a respective one of the air bags for monitoring the pressure within the respective air bag and each pressure sensor electrically connected to the control system for providing pressure input to the control system for the control system to use in the calculation of the set of data.

3. The weight distribution system for a vehicle as in claim 2 further comprising a height sensor for measuring a ride height of the vehicle, the height sensor electrically connected to the control system for providing the ride height input to the control system for the control system to use in the calculation of the set of data.

4. The weight distribution system for a vehicle as in claim 3 wherein the control system area network is electrically connected to the control system for providing a component input to the control system to use in the calculation of the set of data.

5. The weight distribution system for a vehicle further as in claim 4 comprising an algorithm resident within the control system, such that the algorithm receives the pressure input from each pressure sensor, the height input from the height sensor, and the component input from the control system area network and thereby calculates the set of data used to control the manifold.

6. The weight distribution system for a vehicle as in claim 5 further comprising an input device electrically connected to the control system such that the input device receives override input that is communicated to the control system such that when the control system receives the override input, the control system overrides the set of data and uses the override input to control the manifold.

7. The weight distribution system for a vehicle as in claim 6 further comprising a first wireless transmitter in signal communication with the control system such that the control system uses the pressure input from each pressure sensor and converts each such pressure input to calculate a weight amount and sums each of the weight amounts to achieve an overall weight amount such that the first transmitter wirelessly transmits the overall weight amount to a first receiver.

8. The weight distribution system for a vehicle as in claim 7 further comprising a second wireless transmitter in signal communication with the control system such that the control system uses the pressure input from each pressure sensor and converts each such pressure input to calculate a weight amount and sums each of the weight amounts to achieve and overall weight amount such that the second transmitter wirelessly transmits the overall weight amount to a second receiver via a satellite link.

9. The weight distribution system for a vehicle as in claim 1 further comprising a wireless transmitter in signal communication with the control system such that the control system uses the pressure input from each pressure sensor and converts each such pressure input to calculate a weight amount and sums each of the weight amounts to achieve and overall weight amount such that the transmitter wirelessly and terrestrially transmits the overall weight amount to a receiver.

10. The weight distribution system for a vehicle as in claim 1 further comprising a wireless transmitter in signal communication with the control system such that the control system uses the pressure input from each pressure sensor and converts each such pressure input to calculate a weight amount and sums each of the weight amounts to achieve and overall weight amount such that the transmitter wirelessly transmits the overall weight amount to a receiver via a satellite link.

* * * * *